May 20, 1941.  P. A. FANNER  2,242,820
CAR DUMPER
Filed April 8, 1940  5 Sheets-Sheet 1

Fig. 1.

INVENTOR.
Percival A. Fanner
BY Hull, West & Chilton
ATTORNEYS.

May 20, 1941.   P. A. FANNER   2,242,820
CAR DUMPER
Filed April 8, 1940   5 Sheets-Sheet 2

INVENTOR.
Percival A. Fanner
BY
ATTORNEYS.

May 20, 1941.  P. A. FANNER  2,242,820
CAR DUMPER
Filed April 8, 1940  5 Sheets—Sheet 3

INVENTOR.
Percival A. Fanner
BY
ATTORNEYS.

May 20, 1941.  P. A. FANNER  2,242,820
CAR DUMPER
Filed April 8, 1940  5 Sheets-Sheet 5

INVENTOR.
Percival A. Fanner
BY
ATTORNEYS.

Patented May 20, 1941

2,242,820

UNITED STATES PATENT OFFICE 2,242,820

CAR DUMPER

Percival A. Fanner, Lakewood, Ohio

Application April 8, 1940, Serial No. 328,469

15 Claims. (Cl. 214—123)

My invention relates to improvements in car dumping machines used principally for dumping standard railroad cars loaded with bulk material such as coal and ores. In general character and purpose it is similar to the subject matter of my co-pending application Serial No. 279,880, filed June 19, 1939.

One object of my invention is to dump the contents of a car more gently and uniformly than heretofore. This results in less breakage of lump material, less dust from dumping such materials as dry fine coal, and less impact on the receiving means where heavy materials, such as some ores, are dumped. By rotating the car gently about an axis near its center of gravity, as in the case of my invention, the material flows continuously off the top of the load, thereby minimizing the shifting of the particles in the mass.

Another object of my invention is to provide a unique design and construction for car dumpers to the end that the main structural tower is simpler, is braced better in all directions, and is cheaper than in existing dumpers. This is particularly advantageous where the invention is embodied in traveling car dumpers, such being an obvious adaptation of the invention.

Another object of my invention is to provide a car dumper by which the material may be dumped above ground, and many feet higher than is possible with present cylindrical roll-over car dumpers. This eliminates deep pits or tunnels for the receiving apparatus.

Another object of my invention is to provide safer and more positive means for raising and guiding the cylindrical rotor than are used on previous dumpers.

Another object of my invention is to provide a construction incorporating a car carrying rotor whose motion is continuous after once started, whereby greater hoist speeds may be employed, resulting in faster dumping of cars.

Another object of my invention is to provide, in a car dumper incorporating a rotor equipped with a transversely movable car supporting platen, an efficient locking device that automatically becomes effective during the incipient rotation of the rotor to secure the platen against further lateral movement while the rotor is being turned through the remainder of its movement. This relieves the car trucks of heavy side stresses while the cars are being dumped. Another object is to provide a locking device of this nature that automatically adjusts itself to cars of different widths.

With these and other objects in view, my invention may be defined as consisting of the combination and arrangement of parts hereinafter described and pointed out in the claims appended hereto.

In the accompanying drawings, Fig. 14 is a detail of the platen lock, on a scale somewhat larger than that of Fig. 12, showing the same in locked position with the roller just leaving the stop.

Figure 1:
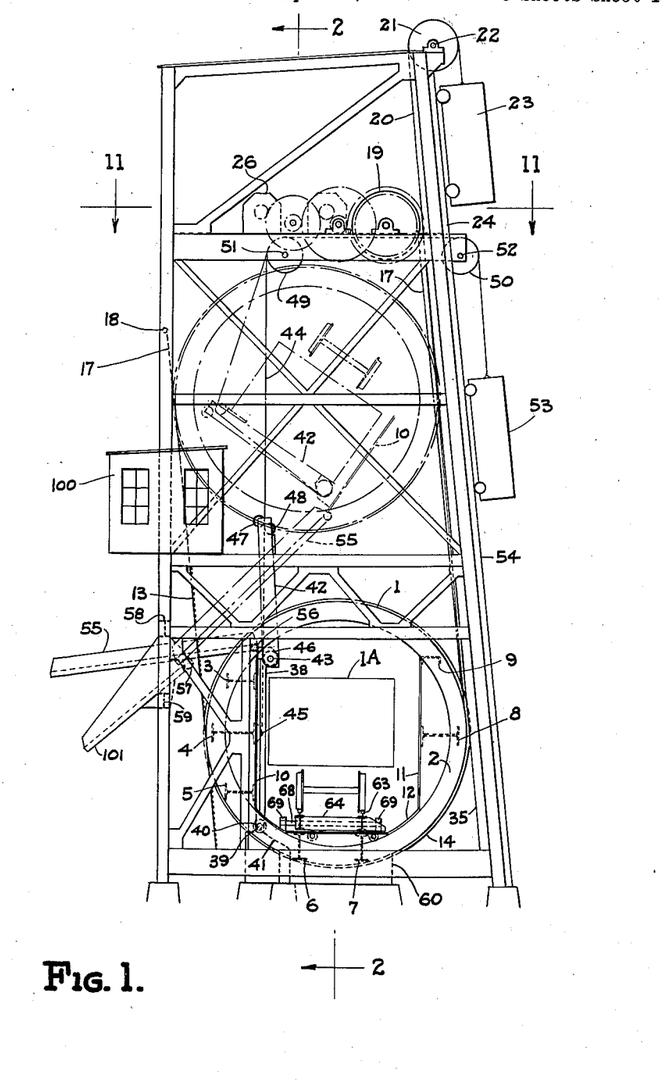
Fig. 1 is an end view, more or less diagrammatic, of my improved car dumper, showing the rotor in car receiving position in full lines, and in car dumping position in dotted lines.
Figure 10:
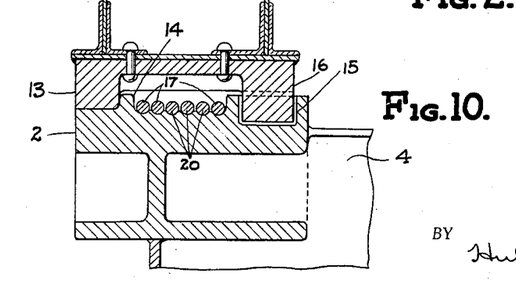
Fig. 10 (sheet 2) is a fragmentary horizontal section through front guide and rotor.
Figure 11:
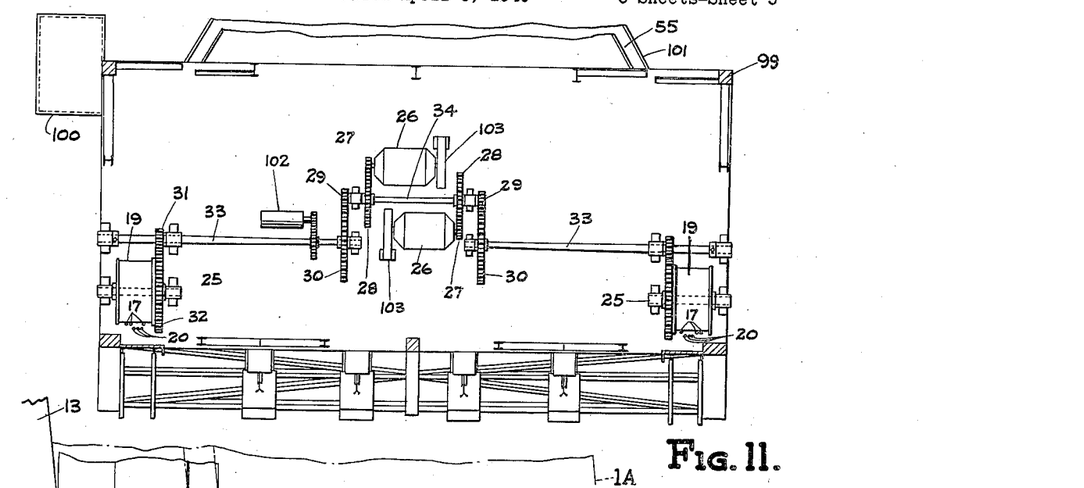
Fig. 11 is a horizontal section through the tower structure above the power platform, as indicated by the line 11—11 of Fig. 1.

Turning now to a detailed description of the embodiment of the invention illustrated in the drawings, without intent of limiting myself to the details further than required by the scope of the appended claims, the rotor, designated 1, is of a size to receive standard railroad cars 1A used for the transportation of coal, ores, etc., and said rotor is made up of two heavy end rings 2 joined together by a series of longitudinal girders 3, 4, 5, 6, 7, 8 and 9, and vertical platings 10 and 11, and substantially horizontal plating 12, all suitably joined together and forming a structure of considerable rigidity. Front guide tracks 13, supported in a slightly inclined position by the front corner posts of the tower structure, are engaged by the end rings 2, and flanges 14 on the latter (see Fig. 10) prevent the rotor from moving endwise in the tower. End rings 2 (Figs. 2 and 10) are provided with a plurality of pockets 15 around a portion of its periphery (constituting, in effect, a shrouded gear segment) which mate with a series of rack teeth 16 that extend alongside and are in substantially the same plane as the guide tracks 13, and shown as integral parts of the same units. These pockets and teeth positively gear the rotor to its vertical tracks and assure its rotation in the same way always. Ropes 17 (Figs. 1, 2 and 10) are anchored at 18 and extend therefrom downwardly and around the end rings 2 of rotor 1, thence upwardly to hoist drums 19 above. Ropes 20 are also anchored at 18, and extend downwardly and around the end rings 2 and thence upwardly about sheaves 21, which revolve on pins 22, thence to counterweights 23 which counterbalance much of the rotor dead weight. As rotor 1 rises and lowers, counterweights 23 lower and rise on guides 24 on the rear side of the tower (Figs. 1 and 3). The drums 19 (Figs. 1 and 11) are mounted on shafts 25 that are driven by two suitable electric motors 26 through gears 27, 28, 29, 30, 31, 32 and shafts 33, 34. Obviously, other prime movers may be used. As will be observed, the ropes 17, between the rear side of the rotor and the drums 19, are inclined somewhat from the vertical and in substantially parallel relation to the tracks 13. This imposes a positive pressure of the rotor against the guide tracks 13 caused by the horizontal component of gravity. This pressure may be brought about by either the guide tracks 13 or the ropes 17 being inclined from the vertical, or both as shown.

Rear guide tracks 35, Fig. 1, are normally clear of the rotor 1, and the flanges 14 on the end rings 2 do not engage these tracks. These tracks 35 safeguard the rotor from twisting out of its guides if the ropes on one end should fail. Should the ropes fail on one end the tendency would be for the gear teeth to slide out of mesh on that end. This rear guide 35 prevents the teeth from disengaging and the torsional stiffness of the rotor prevents the end from falling. The gear pockets 15 and teeth 16 assure the rotor's longitudinal axis being horizontal at all times and the rotor's turning through a definite angle during the dumping cycle as it is lifted by the hoisting mechanism. The hoisting and rotating of the rotor are simultaneous and in definite relation to each other.

The previously mentioned vertical plating 10 of rotor forms a wall against which the car rests while being dumped. Blocks 36 on said wall support the car at this time. On this wall are guides 37 for holding slidably supported, hooked-headed, clamping members 38 that are dropped to engage the top of the car by gravity as rollers 39, mounted on pins 40 at the lower extremity of said members, slide off of guide blocks 41 as the rotor is rotated and lifted upward. A swinging arm 42 is attached at 43 to the head of each clamping member, and said arm is kept in a vertical position by ropes 44 while the rotor 1 is in lowest position. As the rotor rises and turns, the arms engage over the top of the car, as shown by dot and dash lines in Fig. 1. Each rope 44 is anchored to the rotor wall 10 at 45, and passes over a sheave 46 in the head of the corresponding clamping member and thence between sheaves 47 and 48 on the end of the swinging arm 42, thence over sheaves 49 and 50, on pins 51 and 52, respectively, to a counterweight 53 that is slidably mounted on a track 54 on the rear side of the tower (Fig. 1). This gravity clamp automatically adjusts itself to cars of different heights and varying car truck spring compressions.

Figures 4, 5, 6, 7, 8, 9:
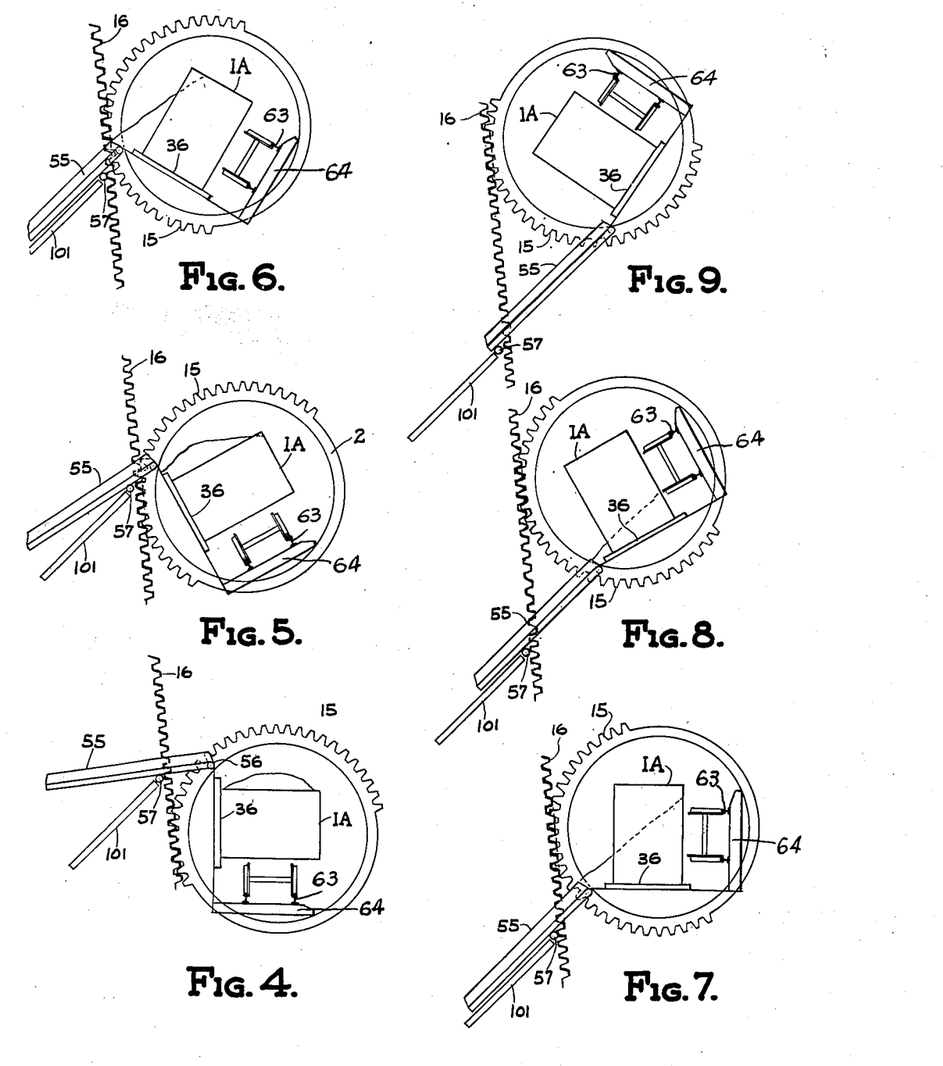
Figs. 4 to 9 inclusive indicate successive positions of the rotor in its continuous movement from the bottom to the top limits of its travel.

Hinged at 56 to the top edge of the front wall or plating 10 of the rotor 1 is a chute 55 that extends the full width of the rotor. The free end of the chute rests on a roller 57 in the tower structure which permits the chute to slide in and out between horizontal girders 58, 59 of the tower structure as the rotor 1 is lifted and rotated. It may be explained that the point of hinge connection between the chute 55 and rotor 1 has a trochoidal motion in respect to guide tracks 13, as will be evident from Figs. 4 to 9, these views showing the rotor as turned through successive angles that are approximately 30° apart. Just before the rotor has been turned approximately 60° (Fig. 6) chute 55 assumes a suitable material discharging angle and retains this desirable inclination with only slight variations until final dumping position (Fig. 9) is reached and rotor has turned through approximately 150°.

Figure 2:
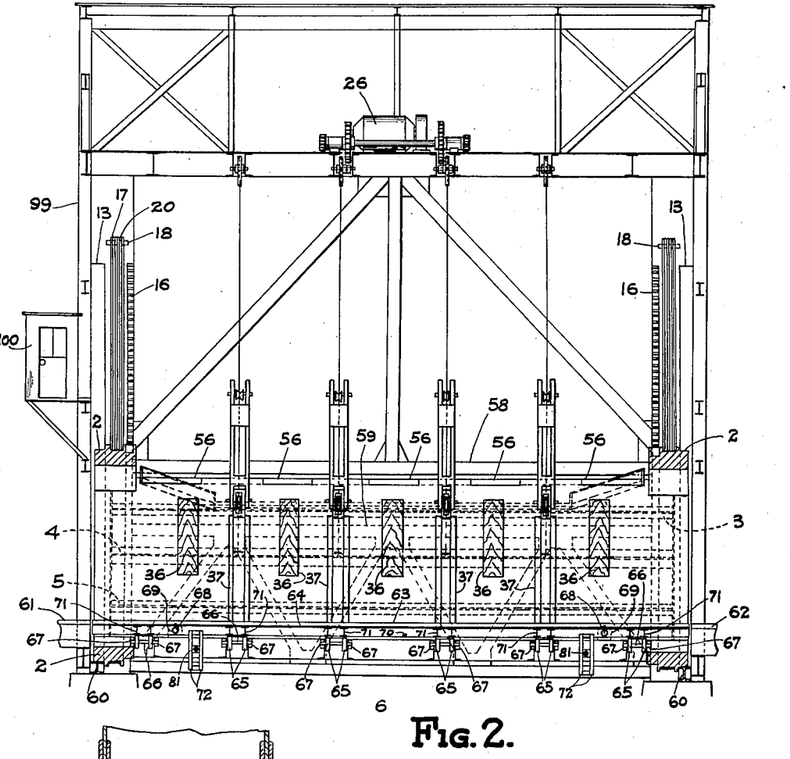
Fig. 2 is a section on the line 2—2 of Fig. 1, looking in the direction of the arrows, and on a scale somewhat smaller than that of the previous view.
Figure 3:
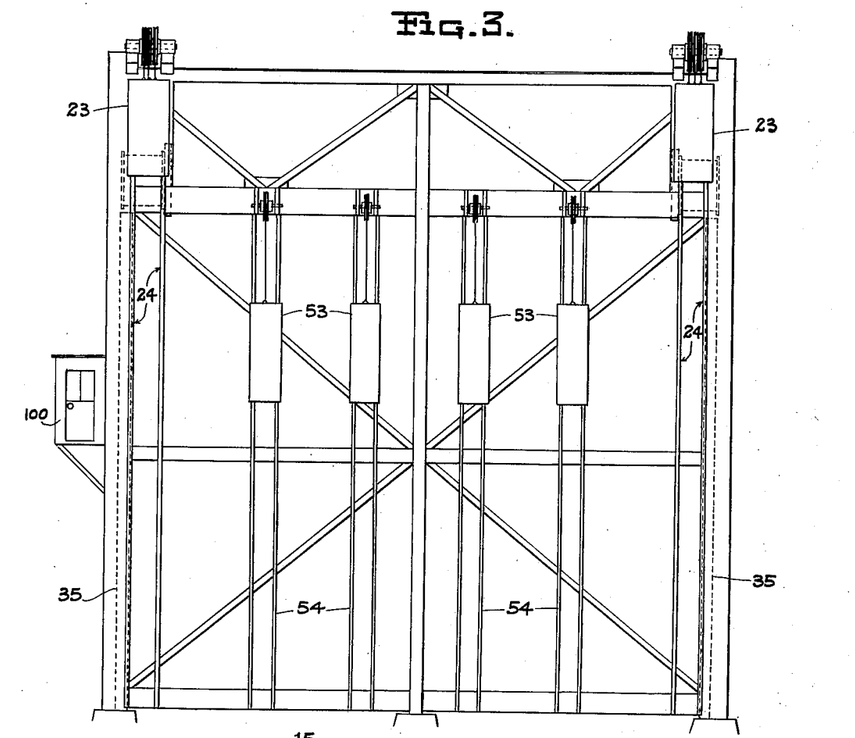
Fig. 3 is a rear elevation of the tower structure showing the counterweights and guides.

When the rotor 1 is in its lowest position it bears on rests 60 wherewith the end rings 2 engage (see Fig. 2). At this time, the approach track 61 and runoff track 62 are in line with track 63 on the platen of the rotor, and there is clearance between blocks 36 on the vertical rotor wall or plating 10 and the widest car to be handled. To facilitate clamping of the car, the car is moved sidewise against blocks 36 and rests on said blocks as the rotor 1 is turned and clamp swinging arms 42 are engaged with the top of car 1A. In order to move the car sidewise, track 63 is supported on a structural carriage or platen 64 which moves transversely on rollers 65 mounted on pins 66 supported in the rotor structure at 67. Horizontal pins 68, held in brackets 69, pass through the carriage structure or platen and hold the same in contact with the rollers when the rotor is turned. Pins 68 also take end loads due to running cars on and off the track 63 and keep the platen in proper longitudinal relation to rotor 1. There are two of these horizontal pins 68, one near each end of platen. The platen is built up of structural steel and consists of two main longitudinal beams 70 under the rails of track 63. Said beams are plated on the top and partly on the bottom, and framed into the same structure are cross members 71 for carrying the vertical load to rollers 65.

Figures 12, 13:
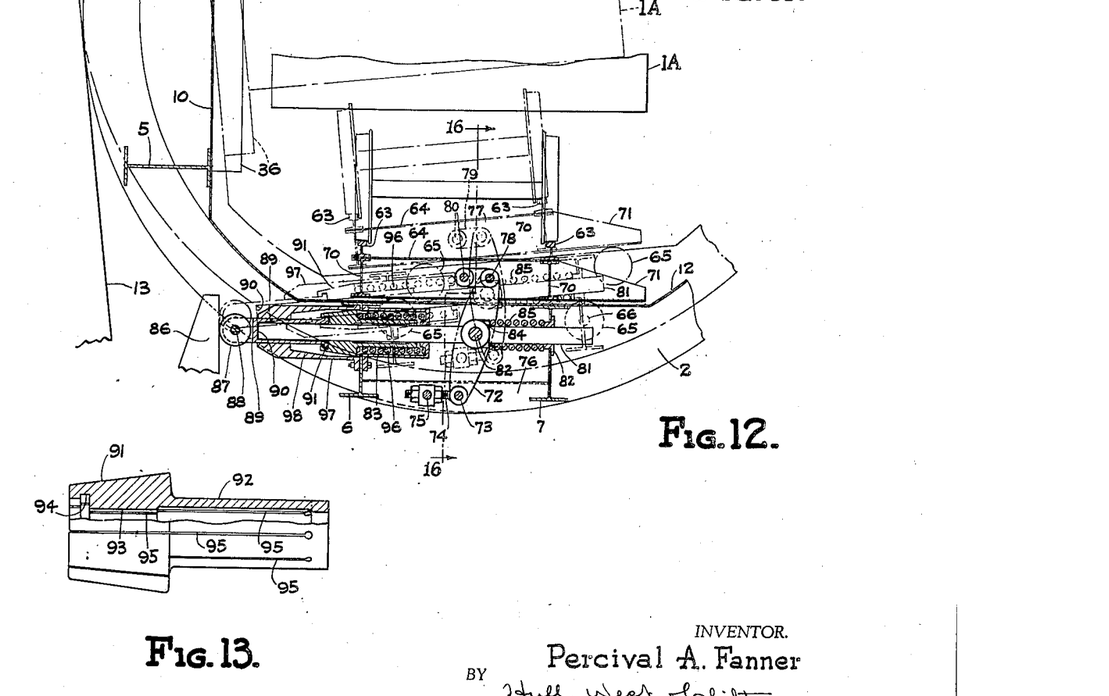
Fig. 12 is a sectional detail showing, in full lines, the platen lock in disengaged or ineffective condition and the rotor in lowest position, under which circumstances the track on the platen is in line with the approach track, the view also showing, in dotted lines, the rotor rolled up sufficient to allow the platen lock to engage.
Fig. 13 is a side elevation, partly in section, of the split conical wedge of the platen lock.
Figures 14, 16:
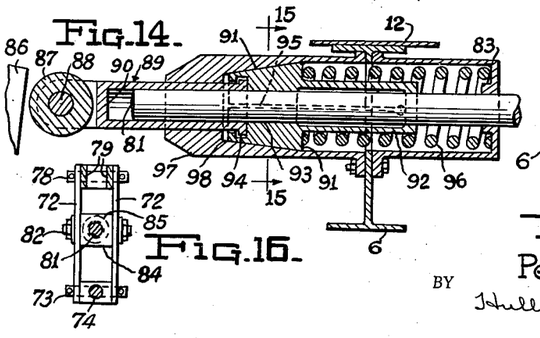
Figure 15:
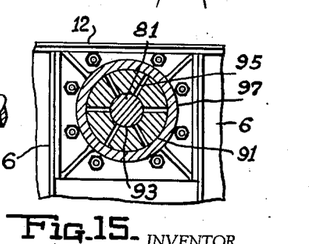
Fig. 15 is a section on the line 15—15 of Fig. 14, and Fig. 16, a section on the line 16—16 of Fig. 12.

When the rotor 1 begins to rise and turn with a loaded car to be dumped, it is desirable that the car be moved over against the blocks 36 as soon as possible and that the platen be locked in its newly assumed position against further lateral movement which would occur if the weight of the platen, burdened with that of the car trucks, were surrendered to the influence of gravity as the rotor approaches an angle sufficient to cause the force of gravity to overcome roller friction. When the rotor is turned through 90°, all of the dead weight of the platen is imposed on the car truck through the car wheel flanges, and this together with the weight of the trucks themselves would stress the trucks in a very undesirable manner. To avoid this, I have devised the novel platen moving and locking mechanism shown in Fig. 12, and which I shall now describe.

Levers 72 are located near the ends of the rotor, as appears in Fig. 2; and each, consisting of spaced side plates, is fulcrumed on a pin 73 in an eye bolt 74 carried in a trunnioned element 75. Said element is supported in cross members 76 of rotor 1. The free end of each lever 72 is pivotally connected to the platen cross member 77 by a pin 78, swinging link 79, and a fixed pin 80 in said member 77. Piercing lever 72, near its midlength, is a push rod 81 pivotally connected to the lever 72 by a pin 82. By this arrangement any longitudinal motion applied to the push rod 81 is multiplied when it reaches platen 64 resulting in the platen moving in less time through the same distance than it would if push rod 81 were directly connected to it. Push rod 81 is slidably engaged, rearwardly of the lever 72, through a thimble 82 that is mounted in an aperture in the longitudinal girder 7 of the rotor, and, forwardly of said lever, through a cylinder 83 that is fastened to the girder 6 in register with a hole therein. Between a shoulder 84 on the push rod 81 and the thimble 82 is a compression spring 85 which is normally compressed when the rotor 1 is in its lowest position. The spring 85 is compressed and the platen held back so that track 63 is aligned with approach track 61 by a stop 86 on the main tower structure wherewith the end of a unit, of which push rod 81 forms a part, is engaged. Said unit includes a roller 87, journaled on a pin 88, in a sliding sleeve 89 that is mounted on and is in direct contact with the front end of push rod 81 at 90. The end of push rod 81 remains in contact with the sliding sleeve 89 at 90 during the initial turning of the rotor until the car 1A comes in contact with blocks 36. Then all relative motion between the push rod 81 and the rotor 1 ceases, and both move together as the rotor continues to turn. Slidably mounted on the push rod 81 is a split wedge element (Fig. 13) having a conical head 91, a cylindrical body 92, gripping surfaces 93, recesses 94, and a plurality of longitudinal slots 95 which permit the conical head 91 to be sprung inward in sections from outside pressure on the head 91 so as to transfer this outside pressure to inside gripping action, through the surfaces 93, on the push rod 81. The conical head 91 is sprung over the flanged end of the sliding sleeve 89, said flanged end fitting loosely in the recesses 94 so as not to interfere with the conical head being collapsed inward to grip the push rod 81. The sliding sleeve 89 becomes locked to the rod 91 when said head is collapsed, under which conditions both must move together. Around the cylindrical body 92 of the wedge element is a compression spring 96 which is normally compressed between the conical head 91 and the end of the cylinder 83 when rotor 1 is in its lowest position. As the rotor 1 turns, the cylinder 83 moves with it, as does also a cylinder 97 which is fastened to the same girder 6 in register with the aforesaid aperture therein. This action permits the spring 96 to expand and urge the conical head 91 toward a complementary conical socket 98 in the cylinder 97. After the car 1A has reached blocks 36, and all relative motion between the push rod 81 and rotor 1 has ceased, the spring 96 will continue to expand until the conical head 91 engages the tapered wall of the conical socket 98 after which the spring pressure, acting through the wedge element, produces a gripping pressure on the push rod 81. This action locks the whole assembly together so it moves with rotor 1 thereafter. The locked condition of the parts is shown in dash and dot lines in Fig. 12. Further rotation and upward movement of the rotor results in the roller 87 leaving the stop 86.

As the rotor rises, more of the weight of the platen 64 and car trucks come on the ends of levers 72 at 78 causing more pressure along the push rods 81, tending to slide same on the internal gripping surfaces 93 of the wedge elements. However, this longitudinal force on the push rods builds up greater wedging effect between the parts and locks the assembly tighter together than before. After the car is dumped and the rotor 1, moving downward, approaches low position, the thrust on the push rod diminishes, especially as the platen assumes a more level position and the rollers 87 strike the stops 86 on the main tower structure. This results in pushing the conical heads 91 out of engagement with the tapered walls of the sockets 98, and as the rotor descends permits the push rods 81 to contact sliding sleeves 89 at 90. Final downward movement of the rotor causes the push rods 81 to compress the springs 85, and, through levers 72, pins 78, swinging links 79 and pins 80, move the platen 64 away from the wall or plating 10 of the rotor until it assumes proper relation with approach and run-off tracks 61 and 62, respectively. This proper relation can be maintained by adjusting the eye bolts 74 in the trunnioned elements 75.

A cycle of operation may be described as follows: After a loaded car 1A has been rolled onto the platen 64 and has pushed off the previously dumped car, the operator, in a house 100, starts the motors 26 which drive, through the various gears and shafts above described, the hoisting drums 19 for winding up the ropes 17. The rotor 1 begins to rise and the car 1A moves sidewise against the blocks 36 on the wall or plating 10, the push rods 81 (Fig. 12) and rotor 1 moving together. The rollers 39 on ends of the vertical sliding clamping members 38 traverse the guide blocks 41 so that the hooked heads of members 38 rest on the top of the car. During this phase, the conical wedge heads 91 approach the tapered walls of sockets 98, and as the rotor 1 continues to rise, the conical heads 91 engage said tapered walls, and the rollers 87 leave stops 86. The platen 64 is securely locked in position against further lateral movement on the rotor 1 by the mechanism just described. The shrouded gears formed by the pockets 15 in the end rings of the rotor engage the teeth 16 of the almost vertical racks incorporated in the front guides 13 along which the rotor rolls, and keep the rotor axis horizontal at all times. Clamp arms 42 are engaged with the top of the car, and, simultaneously, hinged chute 55 assumes proper chuting angle, and the contents of the car are discharged over said chute through the horizontal space between tower members 58 and 59 to a discharging chute 101, all as shown in Figs. 4 to 9 inclusive. When the rotor 1 has reached its highest position, as shown by dot and dash lines in Fig. 1, and diagrammatically in full lines in Fig. 9, the motors are automatically reversed by a standard type traveling-nut limit-switch 102 (Fig. 11) which is geared to one of the hoist shafts 33. This limit-switch 102 is designed to automatically cause the rotor to be lowered, and to be slowed down just as it is being seated on rests 60. The hoisting and lowering of the rotor may be controlled by a simple reversing magnetic control, with dynamic braking in the case of direct current, or regenerative braking if alternating current is used, as will be readily understood by those familiar with the subject to which the invention pertains. The operator in house 100 merely throws a master starting switch at the beginning of each cycle. Brakes 103, on hoisting motors 26, will act to hold the rotor suspended in the loops of hoisting ropes 17 if the electric current is interrupted at any time.

Obviously, the hoisting motors 26, drums 19, gearing and shafts through which they have driving connections, and all other elements of the power unit, may be located elsewhere than in the top of the tower where I have shown them, as, for example, at the ground level rearwardly of the tower. However, for compactness, and notwithstanding the slight additional height of the tower made necessary by the presence of said unit in the top thereof, I prefer the arrangement shown. This is especially advantageous in adapting the invention to a traveling car dumper, as will be readily appreciated. It simply means that a sub-structure of approved type, involving the usual flanged wheels, may be incorporated in the bottom of the tower and mounted upon the customary rails.

While I have illustrated and described the present preferred form of my invention, it will be understood that the invention is not limited to this embodiment alone, but may take any form within the scope of the appended claims.

Having thus described my invention, what I claim is:

1. A car dumper comprising, in combination, a tower structure, ropes having one of their ends anchored to the tower structure at an elevated position on the front side thereof and extending downwardly and thence upwardly within said structure to provide loops, hoisting apparatus associated therewith for drawing in and paying out said ropes, a rotor mounted within the tower structure for rotary and substantially vertical movement and having adjacent the ends thereof drum-like portions wherewith the loops of the aforesaid ropes are engaged, rack-like elements disposed adjacent the front corners of the tower structure, the same being inclined downwardly and rearwardly at a slight angle to the vertical, peripheral gear-like members incorporated in the rotor adjacent each end thereof for cooperation with the rack-like elements, inclined guard means adjacent the rear of the tower structure that are substantially parallel to the aforesaid rack-like elements and arranged to co-act with the rotor for preventing disengagement of the gear-like members from said rack-like elements, the rear sides of the loops of the aforesaid ropes being inclined upwardly and forwardly to assist in holding, through the influence of gravity, the gear-like members in mesh with the rack-like elements, and means for securing a car in the rotor.

2. A car dumper comprising, in combination, a tower structure, guide means adjacent the front of the structure inclined downwardly and rearwardly at a slight angle to the vertical, a rotor mounted within the tower structure for rotary and substantially vertical movement, the same including annular bearing portions for engagement with said guide means, means for raising and lowering the rotor and for imparting rotary motion thereto, means for securing a car in the rotor, a chute hingedly connected to the front side of the rotor at about the elevation of the top of the highest car adapted to be positioned within the rotor, sustaining means on the tower structure by which the chute is supported and with respect to which it adjusts itself when the rotor is raised and lowered in a car dumping operation, said chute sustaining means being at an elevation to support the chute in a forwardly and slightly downwardly inclined position when the rotor is in its lowest position, the axis of the hinge connection between the chute and rotor describing a trochoidal curve during a car dumping operation whereby to maintain the chute at a nearly constant angle during said operation as it moves inwardly and outwardly across said sustaining means.

3. A car dumper comprising, in combination, a tower structure, guide means adjacent the front of the structure inclined downwardly and rearwardly at a slight angle to the vertical, a rotor mounted within the tower structure for rotary and substantially vertical movement, the same including annular bearing portions for engagement with said guide means, said guide means and bearing portions being constructed to co-act with each other in the nature of a rack and gear, means for raising and lowering the rotor, means for securing a car in the rotor, a chute hingedly connected to the front side of the rotor at about the elevation of the top of the highest car adapted to be positioned within the rotor, sustaining means on the tower structure by which the chute is supported and with respect to which it adjusts itself when the rotor is raised and lowered in a car dumping operation, said chute sustaining means being at an elevation to support the chute in a forwardly and slightly downwardly inclined position when the rotor is in its lowest position, the axis of the hinge connection between the chute and rotor describing a trochoidal curve during a car dumping operation thereby to maintain the chute at an almost constant angle during said operation as it moves inwardly and outwardly across said sustaining means.

4. A car dumper comprising, in combination, a tower structure, guide means adjacent the front of the structure, inclined downwardly and rearwardly at a slight angle to the vertical, a rotor mounted within the tower structure for rotary and substantially vertical movement, the same including annular bearing portions for engagement with said guide means, means for raising and lowering the rotor and for imparting rotary motion thereto, means for securing a car in the rotor, a chute hingedly connected to the front side of the rotor at about the elevation of the top of the highest car adapted to be positioned within the rotor, sustaining means on the tower structure by which the chute is supported and with respect to which it adjusts itself when the rotor is raised and lowered in a car dumping operation, said chute sustaining means being at an elevation to support the chute in a forwardly and slightly downwardly inclined position when the rotor is in its lowest position, the axis of the hinge connection between the chute and rotor describing a trochoidal curve during a car dumping operation whereby to maintain the chute at a nearly constant angle during said operation as it moves inwardly and outwardly across said sustaining means, and a load receiving means on the front of the tower structure above which the former chute reciprocates.

5. A car dumper comprising, in combination, a tower structure, guides adjacent the front corners of the structure inclined downwardly and rearwardly at a slight angle to the vertical, a relatively rigid rotor mounted within the tower structure for rotary and substantially vertical movement, the same incorporating ring-like end members for engagement with said guides, said members and guides including parts that cooperate in the nature of a gear and rack, means for raising and lowering the rotor, a chute hingedly connected to the front side of the rotor at an elevation above the top of the highest car that is adapted to be positioned within the rotor, guide means on the tower by which the chute is sustained and with respect to which it adjusts itself when the rotor is raised and lowered, said guide means being at an elevation to support the chute in a forwardly and slightly downwardly inclined position when the rotor is in its lowest position, and means for securing a car in the rotor.

6. In a car dumper, in combination, a structure whereon a car is adapted to be supported and by which it is dumped through a sidewise turning over of said structure, a track supported by the structure for movement transversely thereof and by which the car is sustained, the track being substantially horizontal and in practical alignment with approach and run-off tracks when the structure is in normal position, stop means on the structure against which one side of the car body rests when the structure is turned, said track being capable of shifting in a direction toward the stop means as the car body moves into engagement with said means, and an instrumentality acting to positively hold the track against any but slight initial movement upon engagement of the car body with the stop means.

7. In a car dumper, in combination, a structure whereon a car is adapted to be supported and by which it is dumped through a sidewise turning over of said structure, a track supported by the structure for movement transversely thereof and by which the car is sustained, the track being substantially horizontal and in practical alignment with approach and run-off tracks when the structure is in normal position, stop means on the structure against which one side of the car body rests when the structure is turned, said track being capable of shifting in a direction toward the stop means as the car body moves into engagement with said means, and an instrumentality acting to positively hold the track against any but slight initial movement upon engagement of the car body with the stop means and self releasing as the car body withdraws from said means.

8. In a car dumper, in combination, a structure whereon a car is adapted to be supported and by which it is dumped through a turning over of said structure, a unit supported by the structure for movement transversely thereof, said unit incorporating a track by which the car is sustained, the track being substantially horizontal and in practical alignment with approach and run-off tracks when the structure is in normal position, stop means on the structure against which one side of the car body rests when the structure is turned, said unit shifting in a direction toward the stop means as the car body moves into engagement with said means, an instrumentality having operative connection with the unit, an abutment wherewith a part of said instrumentality engages when the structure approaches or is in normal position thereby to properly position the unit and align the track thereof with the approach and run-off tracks, and means acting automatically to hold the unit against any but slight initial movement as the aforesaid part of the instrumentality withdraws from the abutment at the beginning of a car dumping operation.

9. In a car dumper, in combination, a structure whereon a car is adapted to be supported and by which it is dumped through a turning over of said structure, a unit supported by the structure for movement transversely thereof, said unit incorporating a track by which the car is sustained, the track being substantially horizontal and in practical alignment with approach and run-off tracks when the structure is in normal position, stop means on the structure against which one side of the car body rests when the structure is turned, said unit shifting in a direction toward the stop means as the car body moves into engagement with said means, an instrumentality having operative connection with the unit, an abutment wherewith a part of said instrumentality engages when the structure approaches or is in normal position thereby to properly position the unit and align the track thereof with the approach and run-off tracks, and means rendered effective at the beginning of a car dumping operation by the withdrawal of the aforesaid part of the instrumentality from said abutment for holding the unit against any but slight initial movement.

10. In a car dumper, in combination, a structure whereon a car is adapted to be supported and by which it is dumped through a turning over of said structure, a unit supported by the structure for movement transversely thereof, said unit incorporating a track by which the car is sustained, the track being substantially horizontal and in practical alignment with approach and run-off tracks when the structure is in normal position, stop means on the structure against which one side of the car body rests when the structure is turned, said unit shifting in a direction toward the stop means as the car body moves into engagement with said means, an element supported by the structure for movement transversely of said unit, an abutment wherewith one end of said element engages when the structure is in normal position or is approaching said position after a car dumping operation, said element having operative connection with the unit and serving through its engagement with the abutment to return the unit to normal position on the structure and align the track thereof with the approach and run-off tracks as the structure approaches normal position, spring actuated clutching means for holding said element against any but initial movement as the element withdraws from the abutment at the beginning of a car dumping operation, said clutching means being released by the engagement of the element with the abutment at the conclusion of a car dumping operation.

11. In a car dumper, in combination, a structure whereon a car is adapted to be supported and dumped by a rotary movement of said structure, a platen supported by the structure for movement transversely thereof in a substantially horizontal plane when the structure is in normal position, a track on the platen which is in practical alignment with approach and run-off tracks when the parts are in normal position, the track on the platen being adapted to support a car during the dumping operation, rests incorporated in the structure against which the side of the car body bears while the car is being dumped, a lever connected at one end to the platen and at the other to the structure, the connections being of a pivotal nature, a push rod pivotally connected to the lever intermediate the ends of the latter, a coil spring surrounding the rear end portion of the rod and compressed between an abutment thereon and an abutment on the aforesaid structure, a member movable on the forward end of the rod, a stationary abutment for arresting movement of said member and holding it in a given position when the structure resumes normal position after a car dumping operation, a shell surrounding said member and fastened to the structure and including an internal conical seat, a resilient clamping element attached to the aforesaid member and slidably mounted on the rod and having a tapered head for coaction with said seat whereby the clamping element is contracted about the rod thereby to clutch the same when its conical head is forced into said conical seat, and a compression spring interposed between said clamping element and an abutment on the structure which acts to engage said head with said seat during initial movement of the structure in a car dumping operation, said spring being permitted to act by withdrawal of the aforesaid member from the said stationary abutment.

12. In a car dumper, in combination, a structure whereon a car is adapted to be supported and dumped by a rotary movement of said structure, a platen supported by the structure for movement transversely thereof in a substantially horizontal plane when the structure is in normal position, a track on the platen which is in practical alignment with approach and run-off tracks when the parts are in normal position, the track on the platen being adapted to support a car during the dumping operation, rests incorporated in the structure against which the side of the car body bears while the car is being dumped, a lever connected at one end to the platen and at the other to the structure, the connections being of a pivotal nature, one involving a link and the other an adjustment, a push rod pivotally connected to the lever intermediate the ends of the latter, a coil spring surrounding the rear end portion of the rod and compressed between an abutment thereon and an abutment on the aforesaid structure, a member telescoped over the forward end of the rod, a stationary abutment for arresting movement of said member and holding it in a given position when the structure resumes normal position after a car dumping operation, a shell surrounding said member and fastened to the structure and including an internal conical seat, a resilient clamping element attached to the aforesaid member and slidably mounted on the rod and having a tapered head for coaction with said seat whereby the clamping element is contracted about the rod thereby to clutch the same when its conical head is forced into said conical seat, and a compression spring interposed between said clamping element and an abutment on the structure which acts to engage said head with said seat during initial movement of the structure in a car dumping operation, said spring being permitted to act by withdrawal of the aforesaid member from the said stationary abutment.

13. A car dumper comprising, in combination, a tower structure, a rotor movable up and down and rotatable within the tower structure, means for raising and lowering the rotor and for simultaneously imparting rotary motion thereto, means for securing a car in the rotor, a chute hingedly connected to the front side of the rotor at about the elevation of the top of the highest car adapted to be positioned within the rotor, sustaining means on the tower structure by which the chute is supported and with respect to which it adjusts itself when the rotor is raised and lowered in a car dumping operation, said chute sustaining means being at such an elevation that a part of the chute intermediate its discharge end and its hinge connection with the rotor bears on said sustaining means when the rotor is in its lowest position, the axis of the hinge connection between the chute and rotor describing a trochoidal curve during a car dumping operation whereby to maintain the chute at a nearly constant angle during said operation as it moves inwardly and outwardly across said sustaining means.

14. A car dumper comprising, in combination, a tower structure, ropes having one of their ends anchored to the tower structure at an elevated position on the front side thereof and extending downwardly and thence upwardly within said structure to provide loops, hoisting apparatus associated therewith for drawing in and paying out said ropes, a rotor wherein a car is adapted to be secured so as to turn in unison therewith, said rotor being mounted within the tower structure for rotary and up-and-down movement and including drum-like portions bearing as in a sling in the loops of the aforesaid ropes, continuous rack-like elements extending up and down the front of the tower structure throughout the range of movement of the rotor, and peripheral gear-like members incorporated in the rotor for cooperation with the rack-like elements, the relation between the plane of the rack-like elements and that of the rear flights of the loops of the aforesaid ropes being such as will cause the gravitational tendency of the rotor to enhance the traction between said gear-like members and said rack-like elements.

15. A car dumper comprising, in combination, a tower structure, ropes having one of their ends anchored to the tower structure at an elevated position on the front side thereof and extending downwardly and thence upwardly within said structure to provide loops, hoisting apparatus associated therewith for drawing in and paying out said ropes, a rotor wherein a car is adapted to be secured so as to turn in unison therewith, said rotor being mounted within the tower structure for rotary and up-and-down movement and including drum-like portions bearing as in a sling in the loops of the aforesaid ropes, continuous rack-like elements extending up and down the front of the tower structure throughout the range of movement of the rotor, peripheral gear-like members incorporated in the rotor for cooperation with the rack-like elements, and guard means adjacent the rear of the tower structure parallel to the aforesaid rack-like elements and arranged to coact with the rotor for preventing disengagement of the gear-like members from said rack-like elements.

PERCIVAL A. FANNER.